(12) United States Patent
Mahendru et al.

(10) Patent No.: US 10,666,902 B1
(45) Date of Patent: May 26, 2020

(54) DISPLAY CONFLICT ELIMINATION IN VIDEOCONFERENCING

(71) Applicant: MICROSOFT TECHNOLOGY LICENSING, LLC, Redmond, WA (US)

(72) Inventors: Kshitij Mahendru, Kirkland, WA (US); Sabra Alexis Wieditz Rossman, Bellevue, WA (US); Shivaram Prabhakar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/262,859

(22) Filed: Jan. 30, 2019

(51) Int. Cl.
*H04N 7/14* (2006.01)
*H04N 7/15* (2006.01)
*G06F 3/0484* (2013.01)
*G06F 3/0482* (2013.01)

(52) U.S. Cl.
CPC ............. *H04N 7/15* (2013.01); *G06F 3/0484* (2013.01); *G06F 3/0482* (2013.01)

(58) Field of Classification Search
CPC ...................................................... H04N 7/14
See application file for complete search history.

(56) References Cited

U.S. PATENT DOCUMENTS

| | | | |
|---|---|---|---|
| 8,421,840 B2 * | 4/2013 | Eleftheriadis | H04N 7/152 348/14.07 |
| 8,947,493 B2 | 2/2015 | Lian et al. | |
| 9,288,259 B2 | 3/2016 | Shao et al. | |
| 9,883,144 B2 | 1/2018 | Marlow et al. | |
| 9,959,031 B2 | 5/2018 | de Leon et al. | |
| 2005/0066278 A1 * | 3/2005 | Sloo | H04N 5/44504 715/716 |

(Continued)

OTHER PUBLICATIONS

"Virtual Desktop Infrastructure (VDI) and Desktop Videoconferencing", Retrieved from: https://web.archive.org/web/20161020035136/http:/www.avistar.com/wp-content/uploads/VDI-and-Desktop-Videoconferencing_WP_2012.pdf, Oct. 20, 2016, pp. 1-5.

(Continued)

*Primary Examiner* — Olisa Anwah
(74) *Attorney, Agent, or Firm* — NovoTechIP International PLLC (57) ABSTRACT

A device is disclosed, which includes a processor and a memory in communication with the processor. The memory includes executable instructions that, when executed by the processor, cause the processor to control the device to perform functions of receiving user interaction data from a remote device via a communication network, the user interaction data indicating user interaction with a graphical user interface of the remote device; determining, based on the user interaction data, that the user interaction causes a display conflict between the graphical user interface of the remote device and visual information displayed on the graphical user interface of the remote device; and resolving the display conflict by causing the remote device to display modified visual information. The device thus allows a user to see and interact with the graphical user interface without needing to stop or pause displaying the visual information or to wait for the visual information display to be over.

20 Claims, 8 Drawing Sheets

(56) References Cited

U.S. PATENT DOCUMENTS

| | | | | |
|---|---|---|---|---|
| 2005/0264648 | A1* | 12/2005 | Ivashin | H04N 7/152 348/14.09 |
| 2012/0089666 | A1* | 4/2012 | Goswami | G06Q 10/103 709/203 |
| 2013/0290857 | A1* | 10/2013 | Beveridge | G06F 3/0484 715/740 |
| 2014/0055554 | A1 | 2/2014 | Du et al. | |
| 2014/0123135 | A1* | 5/2014 | Huang | H04L 41/5054 718/1 |
| 2014/0372921 | A1 | 12/2014 | Efrati et al. | |
| 2015/0002610 | A1* | 1/2015 | Hansen | H04N 7/152 348/14.07 |
| 2015/0097915 | A1* | 4/2015 | Navon | H04N 7/152 348/14.1 |
| 2015/0341596 | A1* | 11/2015 | Noy | H04N 7/152 348/14.09 |
| 2016/0065625 | A1 | 3/2016 | Ouyang et al. | |
| 2016/0173823 | A1* | 6/2016 | Duckworth | H04N 7/142 348/14.07 |
| 2018/0295326 | A1* | 10/2018 | Miao | G06T 3/40 |

OTHER PUBLICATIONS

Birkinshaw, et al., "Plan for Skype for Business in VDI environments", Retrieved from: https://docs.microsoft.com/en-us/skypeforbusiness/plan-your-deployment/clients-and-devices/vdi-environments, Jan. 9, 2018, 7 Pages.

* cited by examiner

DISPLAY CONFLICT ELIMINATION IN VIDEOCONFERENCING

A virtual machine (VM) is commonly known as an isolated duplicate of a real computer machine, which very often has no direct correspondence to any specific hardware platform. A physical hardware running a VM is generally referred to as a host device, and the virtual machine emulated on that machine is generally referred to as an endpoint. In certain situations, a host device can emulate several endpoints, and each endpoint can emulate a different operating system and hardware platform. A hypervisor, which is the VM's emulation engine, handles virtual hardware, including a CPU, memory, hard drive, network interface, and other devices. The virtual hardware are mapped to real hardware devices on a physical machine. For example, a VM's virtual hard disk is stored in a file located on a hard disk drive (HDD) of a physical machine.

VMs are becoming more common with the evolution of virtualization technology because they are easy to manage and maintain, and offer simplified application provisioning and disaster recovery options. Hence, VMs are widely used in various industries, such as, education, defense, software development, banking, finance, etc. However, a VM cannot operate as efficiently as a physical computer since hardware resources for a VM are distributed and utilized in an indirect way. Hence, VMs cannot perform a task involving processing a large amount of data, such as media streaming, computer graphics, media content creation, etc., as efficiently and smoothly as a physical computer can. For example, when videoconferencing is carried out among VM and non-VM endpoints, there is a technical problem that each participating VM endpoint typically experiences a noticeable degree of delay and lag when receiving and sending a video/audio stream from/to other VM or non-VM endpoints. Accordingly, there still remain significant areas for new and improved technical solutions for more effective ways to utilize a VM for video streaming or videoconferencing.

SUMMARY

A device is disclosed, which includes a processor and a memory in communication with the processor. The memory includes executable instructions that, when executed by the processor, cause the processor to control the device to perform functions of receiving user interaction data from a remote device via a communication network, the user interaction data indicating user interaction with a graphical user interface of the remote device; determining, based on the user interaction data, that the user interaction causes a display conflict between the graphical user interface of the remote device and visual information displayed on the graphical user interface of the remote device; and resolving the display conflict by causing the remote device to display modified visual information.

In another implementation, a method of operating a device is disclosed, which includes receiving user interaction data from a remote device via a communication network, the user interaction data indicating user interaction with a graphical user interface of the remote device; determining, based on the user interaction data, that the user interaction causes a display conflict between the graphical user interface of the remote device and visual information displayed on the graphical user interface of the remote device; and resolving the display conflict by causing the remote device to display modified visual information.

In another implementation, a device is disclosed, which includes a processor and a memory in communication with the processor. The memory includes executable instructions that, when executed by the processor, cause the processor to control the device to perform functions of: displaying visual information on a graphical user interface of the device; detecting user interaction with the graphical user interface, the user interaction causing a display conflict between the graphical user interface and the visual information displayed on the graphical user interface; sending user interaction data to a remote device via the communication network, the user interaction data indicating the user interaction causing the display conflict; receiving, from the remote device via the communication network, control data to resolve the display conflict; and modifying, based on the received control data, the visual information to resolve the display conflict.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to eliminating or reducing a display conflict. A display conflict may occur when a graphical user interface (GUI) is at least partially overlapped by visual information (e.g., a video, image, etc.) displayed on the GUI. For example, user interaction with the GUI may cause a visual element (e.g., a pop-up menu, dialog box, notification, etc.) to appear on the GUI. The visual element of the GUI may be at least partially overlapped by visual information displayed on the GUI such that a user cannot see and interact with the visual element. Such display conflict may occur when the visual information is overlaid on an area of the GUI where the visual element is caused to appear. The overlaying of visual information may be performed when a device is operating a virtual application (e.g., a virtual videoconferencing or video streaming application) in a virtual machine (VM) environment. The virtual application may operate as efficiently as a physical computer and may cause a delay or slowing down in sending, receiving and processing a large amount of data. To solve this technical problem, a device may receive and process source data used for generating the visual information outside the VM environment, and overlay the generated visual information onto or otherwise combined with the GUI of the virtual application. The visual information overlaying etc. may also be performed in a remote desktop or remote display environment When a user interact with the GUI to operate the virtual application, a visual element may be activated to appear on the GUI of the virtual application. However, the activated visual element may be overlapped and hidden by the visual image overlaid on the GUI, which makes it difficult or impossible for a user to see and interact with the visual element without stopping the visual image being overlaid. This may mean that, to be able to see and interact with the activated visual element, the user need to terminate an on-going visual information display session (e.g., a videoconferencing or video streaming session) or wait until the current visual information display session is over.

To solve this problem, when the display conflict occurs at a remote device, a device (e.g., a VM host device) may receive user interaction data from the remote device (e.g., a VM endpoint device) and determine whether a display conflict is caused at the remote device based on the user interaction data. When the display conflict is caused, the device may control the remote device to modify the visual information such that a portion of the visual information is removed to show the visual element. For example, the device may control the remote device to remove a portion of the visual information corresponding to the coordinates of the visual element such that the visual element does not become overlapped and hidden by the overlaid visual information. This may allow a user of the remote device to see and interact with the visual element without needing to terminate the on-going visual information display session or wait until the visual information display session is over.

Figure 1A:
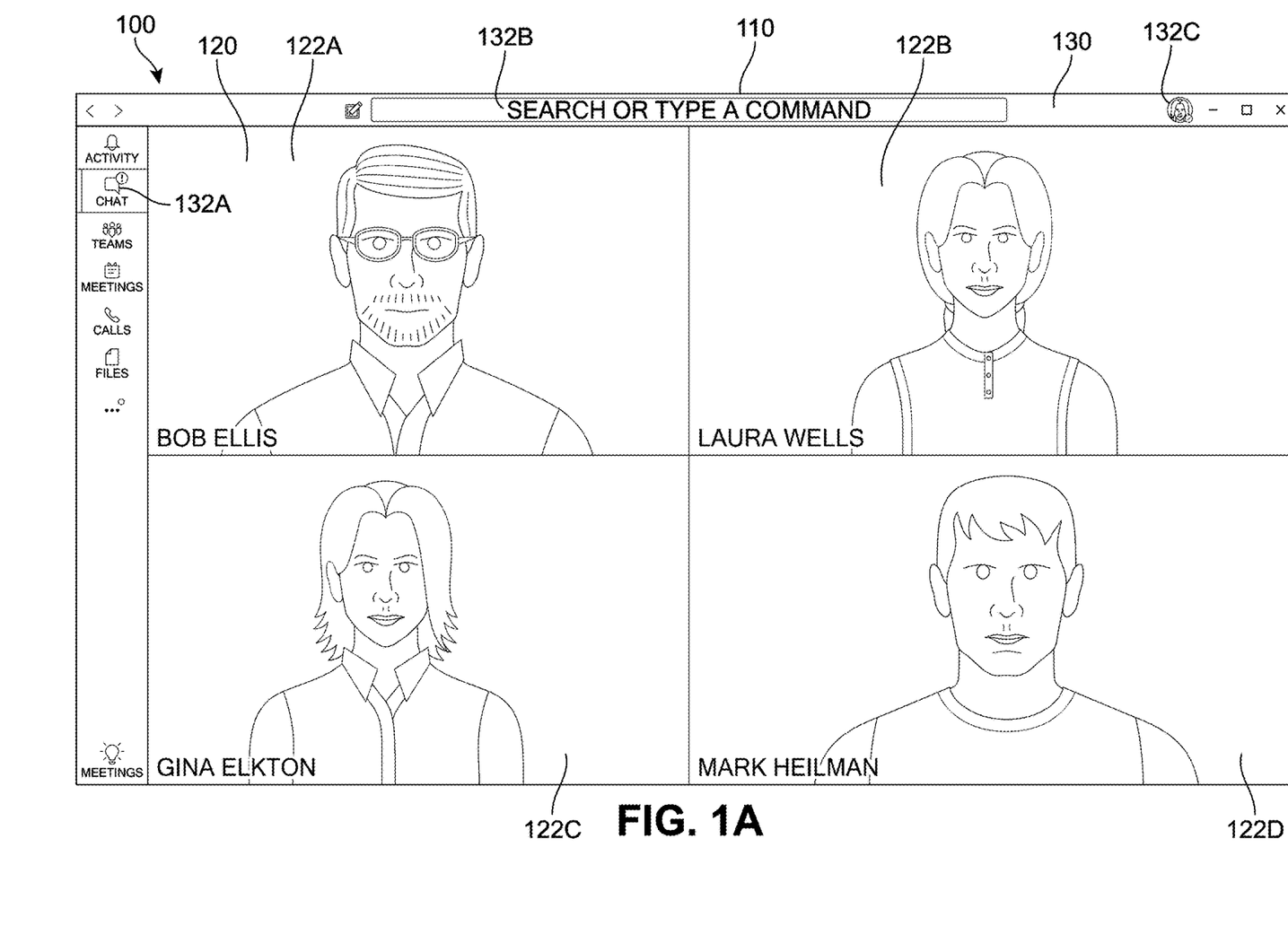
FIG. 1A illustrates an implementation of a graphical user interface of a virtual application.

With this overview, attention is now turned to the figures to described various implementations of the presenting teachings. FIG. 1A shows an implementation of a GUI 110 of a virtual application 100, such as a videoconferencing application. The GUI 110 may include a visual information display area 120 and a menu area 130. The visual information display area 120 may be designated for displaying visual information, such as, live video images of remote videoconference participants. When there are more than one remote participant, more than one video image may be shown in the visual information display area 120. For example, as shown in FIG. 1A, when there are four remote participants, four different video images 122A, 122B, 122C and 122D may appear on the visual information display area 120. The video images 122A, 122B, 122C and 122D are referred to as video images 122 hereinafter.

Some or all of the video images 122 may be overlaid to fit onto the visual information display area 120. The overlaying of the video images 122 may be performed when the videoconferencing application 100 cannot receive, send and process a large amount of data at a speed acceptable for a communication or streaming session, such as, videoconferencing or video streaming. For example, the videoconferencing application 100 may be operating in a virtual machine (VM) environment. The videoconferencing application 100 operating in a VM environment may not operate as efficiently as a physical computer since hardware resources for the VM environment are distributed and utilized in an indirect way, which may slow down sending, receiving and processing a large amount of data. To solve this technical problem, source data (e.g., live video feed data) for generating the video images 122 may be received and processed by a local device to generate the video image outside the VM environment, and the generated video image 122 may be overlaid onto the visual information display area 120 of the virtual application 100. The video image overlaying may also be performed in a remote desktop or remote display environment. The technical problem with this solution is that when one or more menu items from menu area 130 are selected, it may extend into the display area 120 and hide beneath the overlaid video image. Therefore, the selected menu item may not be shown.

Figure 4:
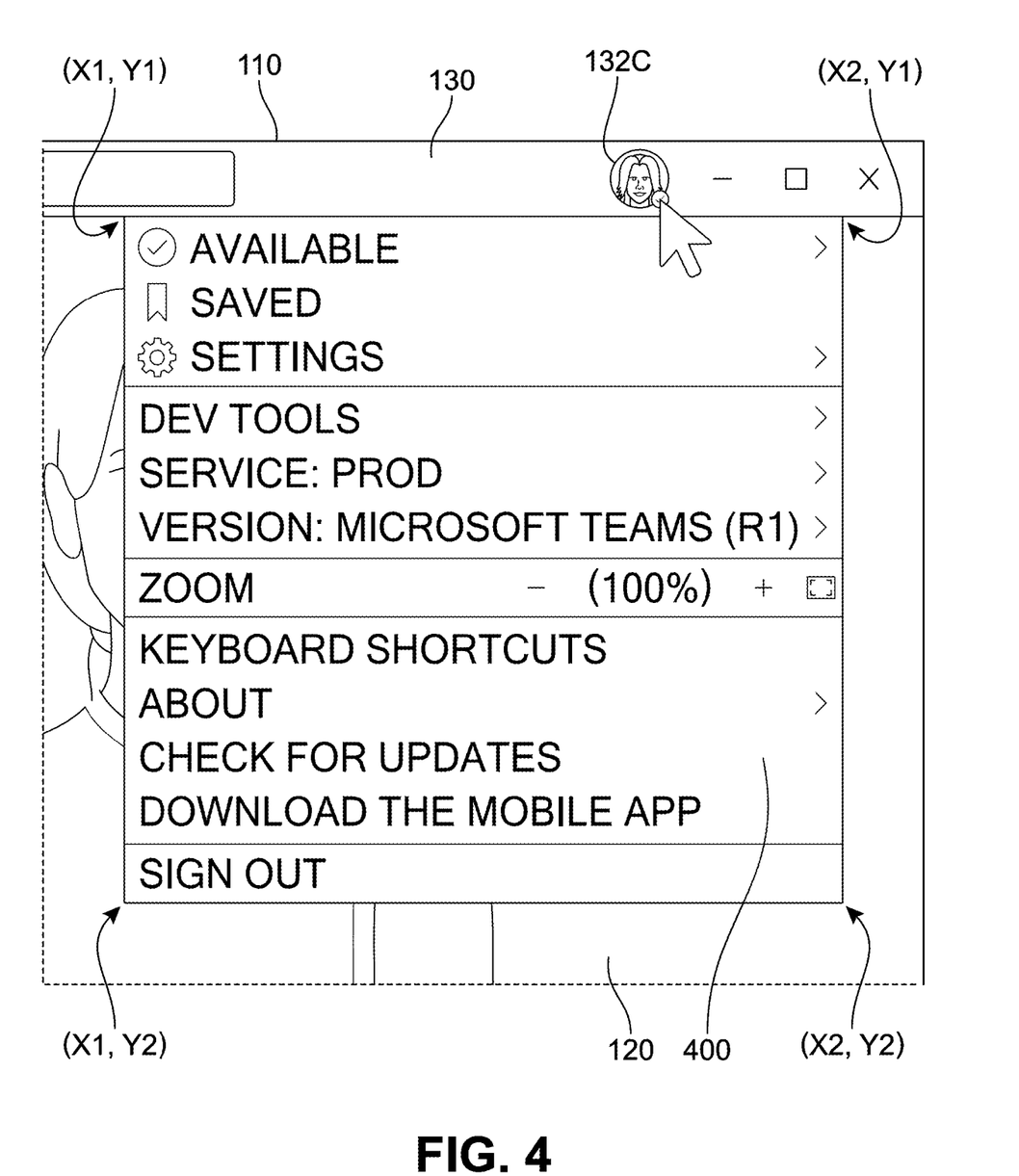
FIG. 4 illustrates an implementation of determining coordinates of a visual element of the graphical user interface.

To illustrate further, the menu area 130 may be located outside the visual information display area 120. The menu area 130 may include various graphical elements, such as, an icon 132A, text box 132B, avatar 132C, etc., which are collectively referred to as graphical elements 132 hereinafter. A user may select the graphical elements 132 by, for example, using a mouse or keyboard, to operate or interact with the videoconferencing application 100. For example, the user may click the icon 132A to operate the videoconferencing application 100 to show conferencing history. The text box 132B may be used to enter a name or keyword to search a person or previous conference. The user's interaction with the graphical elements 132 of the GUI 110 may cause a visual element (e.g., a pop-up menu, dialog box, text/image box, notification box, etc.) be displayed on the GUI 110. For example, the user may click the avatar 132C to activate a pop-up menu 140 on the GUI 110, which may show various information or options, such as, user availability, setting, tools, etc. An example of such pop-up menu is shown in FIG. 4.

Such visual element is very often configured to extend to the visual information display area 120. In some cases, the entire visual element may appear in the visual information display area 120. In other cases, a portion of the visual element may overlap the visual information display area 120. However, the visual element overlapping the visual information display area 120 may not be shown when the video image 122 is overlaid onto the visual information display area 120. Other visual element appearing in the visual information display area 120 may also be overlapped and hidden by the overlaid video image 122. Hence, the user may not be able to see and interact with the visual element until the videoconferencing session is completed or the video images 122 are no longer overlaid. This type of technical display problem is referred to as a display conflict hereinafter. The display conflict may be manifested in the visual element of the GUI being at least partially overlaid by the visual information displayed on the GUI.

Figure 1B:
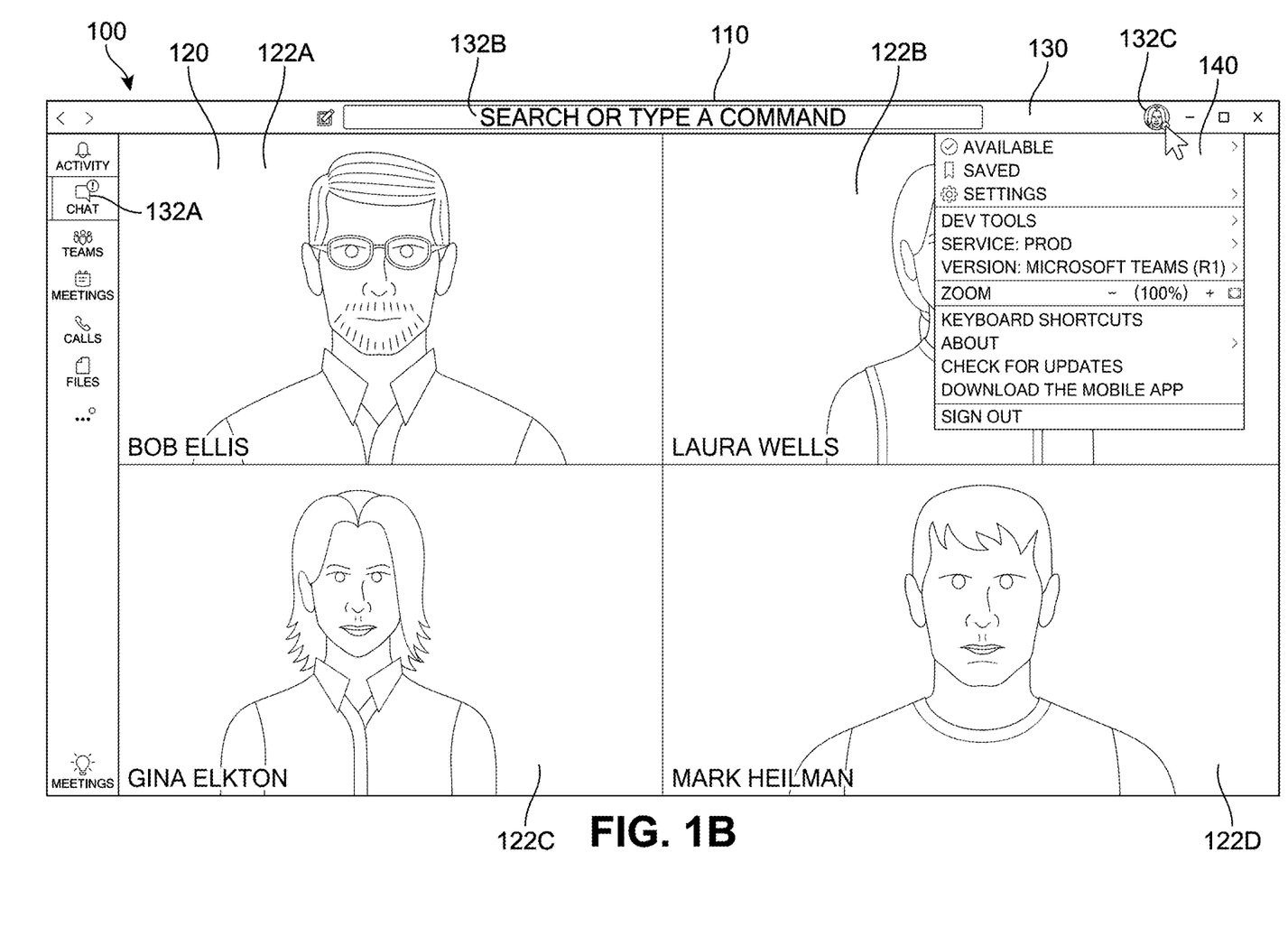
FIG. 1B illustrates the graphical user interface of the virtual application shown in FIG. 1A, in which a portion of visual information is removed to show a visual element of the graphical user interface.

To eliminate or reduce such display conflict, the technical solution of the instant application includes modifying the overlaid video image 122 such that the visual element appearing in the visual information display area 120 is not overlapped and hidden by the overlaid video image 122. For example, as shown in FIG. 1B, the user may select the avatar 132C to activate a visual element 140 (e.g., a pop-up menu) to appear in the visual information display area 120. When the user's interaction with the avatar 132C is detected, the overlapping video image 122B may be modified to remove a portion overlapping the visual element 140 such that the visual element 140 is not overlapped and hidden when activated. This allows the user to see and interact with the visual element 140 anytime without needing to stop overlaying the video images 122. While the visual element 140 is activated, the video image 122B modified to show the visual element 140 may be stopped or paused. The video image 122B may be replaced by an avatar image or name. Other video images 122A, 122C and 122D that do not overlap the visual element 140 may be normally displayed.

Figure 2:
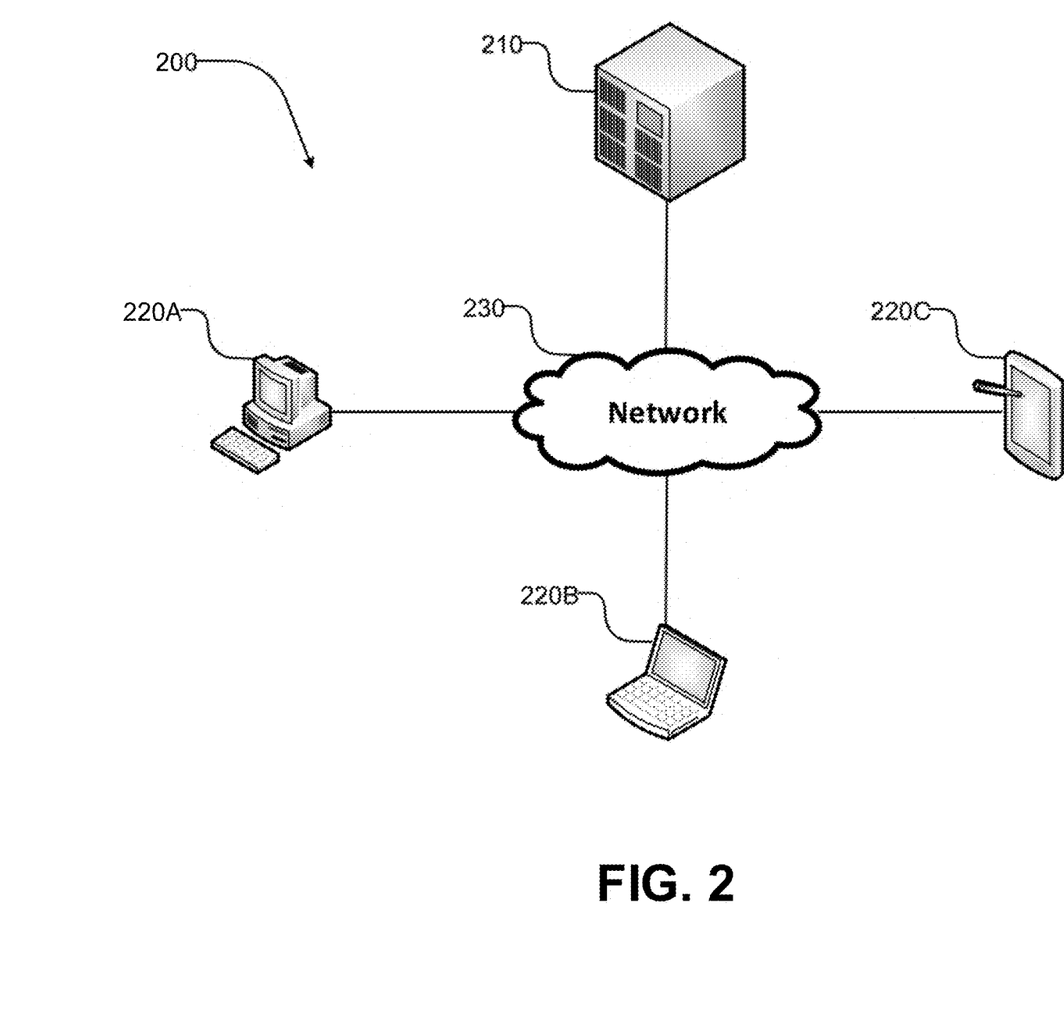
FIG. 2 illustrates an implementation of a media communication system.

FIG. 2 illustrates an implementation of a media communication system 200, for example, a videoconferencing system. The system 200 may include a host device 210 and a plurality of endpoint devices, such as, endpoint devices 220A, 220B and 220C, which are referred to as endpoint devices 220 hereinafter. The host device 210 may be a server configured to host a videoconferencing session. The endpoint devices 220 may be any device capable of performing a videoconferencing session, such as, a desktop, laptop, smartphone, tablet, etc. The endpoint devices 220 may be connected to the host device 210 via a communication network 230. The endpoint devices 220 may also be connected to each other via the network 230.

The endpoint devices 220 may operate a communication or streaming application 100, such as, the videoconferencing application shown in FIGS. 1A and 1B. The videoconferencing application 100 may be operated in a VM environment such that the videoconferencing application 100 may be hosted by the host device 210. For example, the endpoint device 220 may initiate a VM session hosted by the host device 210, and download and execute the videoconferencing application 100 in the VM environment. This may allow the host device 210 to remotely control the endpoint devices 220 and their respective videoconferencing application 100 to initiate and carry out a videoconferencing session among the endpoint devices 220. When the videoconferencing application 100 is operated in the VM environment, the host device 210 or endpoint device 220 may determine that the captured source data need to be directly sent to other endpoint devices 220 without going through the host device 210.

In an implementation, the host device 210 may control the endpoint devices 220 and their respective videoconferencing application 100 to ensure that source data is directed from one endpoint device 220 to another without going through the host device 210. For example, when the endpoint device 220A is operating the videoconferencing application 100 in a VM environment, the endpoint devices 220B and 220C may send their captured video signals directly to the endpoint device 220A such that the video images 122 may be generated outside the VM environment and overlaid to the GUI 110 of the videoconferencing application 100. The host device 210 may also control the endpoint devices 220 to generate and overlay the video image 122 on the GUI 110 of the videoconferencing application 100.

Figure 3:
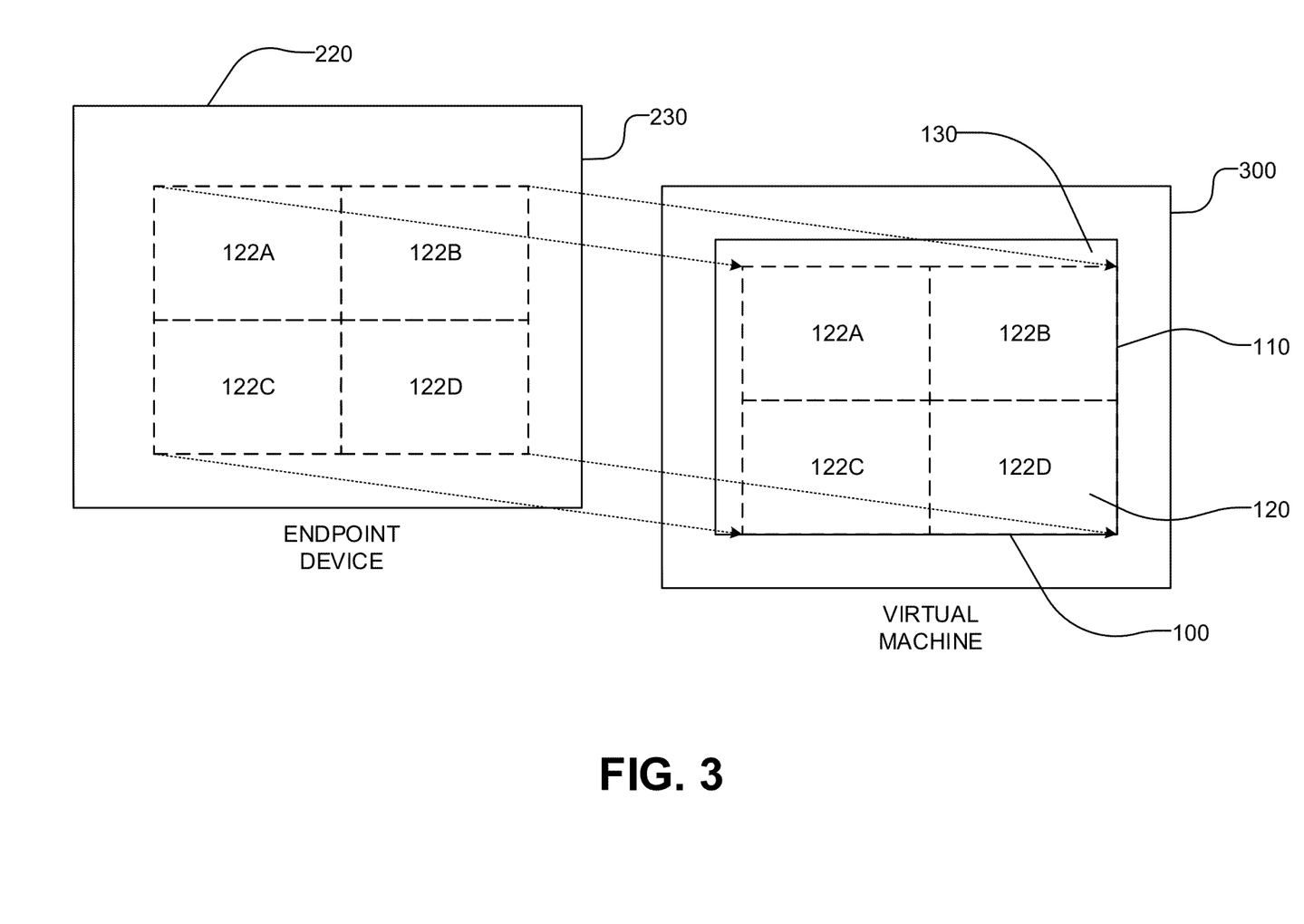
FIG. 3 illustrates an implementation of multiple video images being overlaid to the graphical user interface of the virtual application operating at an endpoint device.

FIG. 3 illustrates an implementation of multiple video images 122 being overlaid to the GUI 110 of the videoconferencing application 100 operating at the endpoint device 220. The endpoint device 220 may operate the videoconferencing application 100 in a VM environment, and the GUI 110 of the videoconferencing application 100 may be displayed on a virtual desktop 300. The videoconferencing application 100 may be remotely controlled by the host device 210 to carry out a videoconferencing session. The endpoint device 220 may receive source data directly from other endpoint devices or via the host device 210. The endpoint device 220 may then process the received source data to generate the video images 122A, 122B, 122C and 122D outside the VM environment. The endpoint device 220 may then receive, from the videoconferencing application 100 or the host device 210, video overlay information, which may include size and coordinates for each video image 122 on the virtual desktop 300. For example, as shown in FIG. 3, based on the video overlay information, that the endpoint device 200 may adjust the sizes and locations of the video images 122A, 122B, 122C and 122D to be arranged in a 2×2 matrix on an area 230 corresponding to the virtual desktop 300. Specifically, the video images 122 may be adjusted and arranged to correspond to the visual information display area 120. Then, the endpoint 220 may overlay the video images 122A, 122B, 122C and 122D onto the visual information display area 120 such that the video images 122A, 122B, 122C and 122D appear to be displayed via the GUI 110 of the videoconferencing application 100. As described above, such overlaying of the video images 122 onto the GUI 110 of the videoconferencing application 100 may cause a display conflict, which, in some cases, does not allow a user to operate or interact with the videoconferencing application 100.

FIG. 4 illustrates an implementation of determining coordinates of a visual element 400 of the GUI 110 of the videoconferencing application 100. When the user interacts with the GUI 110 by, for example, clicking the avatar 132C to activate the visual element 400, the endpoint device 220 may send user interaction data to the host device 210 via the communication network 230. The user interaction data may indicate that the user's interaction with the GUI of 110 may cause a display conflict between the GUI 110 and the video image 122. The host device 210 may store coordinates information of the visual element 400. When the visual element 400 is activated to appear on the visual information display area 120 of the GUI 110, the host device 210 may calculate coordinates for the visual element 400 on the GUI 110 or virtual desktop 300 and provide the calculated coordinates to the endpoint device 220. For example, the host device 210 may calculate coordinates (X1, Y1), (X1, Y2), (X2, Y1) and (X2, Y2) of the four corners of the visual element 400 on the GUI 110 or virtual desktop 300, and may send the calculated coordinates (X1, Y1), (X1, Y2), (X2, Y1) and (X2, Y2) to the endpoint device 220. Based on the received coordinate information, the endpoint device 220 may identify and modify the overlaid video image 122 overlapping the visual element 400. For example, the endpoint device 220 may remove a portion of the video image 122 corresponding to an area defined by the coordinates (X1, Y1), (X1, Y2), (X2, Y1) and (X2, Y2). The remaining portion of the video image 122 may be stopped or paused. Alternatively, the remaining portion the video image 122 may be replaced with an avatar or name of the participant corresponding to the video image 122. By modifying the overlapping video image 122, the visual element 400 becomes visible to the user, thereby eliminating the display conflict between the GUI 110 and the overlaid video image 122.

Figure 5:
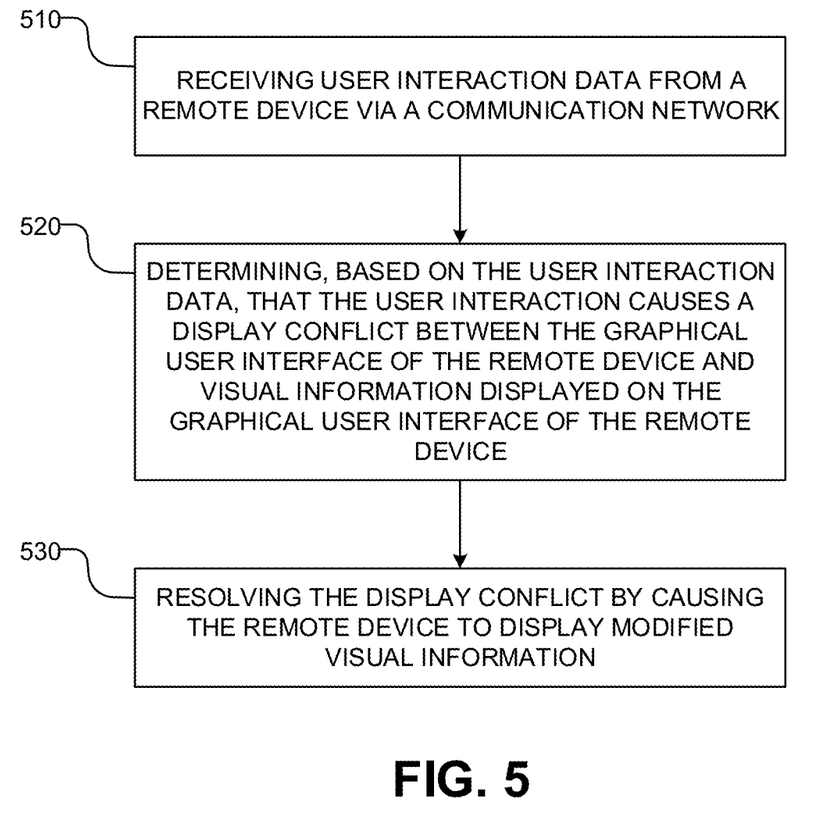
FIG. 5 is a flowchart of an implementation of a process for operating a host device to eliminate or reduce a display conflict.

FIG. 5 is a flowchart of an implementation of a process for operating a device, such as the host device 210, to eliminate or reduce a display conflict. At step 510, the device may receive user interaction data from a remote device via a communication network. The user interaction data may indicate user interaction with a GUI of the remote device. For example, with reference to FIG. 2, the host device 210 may receive remote user interaction data from the endpoint device 220 via the communication network 230. The remote user interaction data may indicate a remote user's interaction with the GUI 110 of the videoconferencing application 100 being operated at the endpoint device 210.

To enable a videoconferencing session, the host device 210 may cause source data for the video image 122 to be directed to the endpoint device 220. For example, the host device 210 may receive source data from the endpoint devices 220B and 220C and forward the received source data to the endpoint device 220A. Alternatively, the host device 210 may be in communication with the endpoint devices 220B and 220C to control the endpoint devices 220B and 220C to send the source data to the endpoint device 220A without going through the host device 210. The host device 210 may also send control data to the endpoint device 220A via the communication channel 230 to cause the endpoint device 220A to generate the video images 122 based on the source data and to display the video images 122 on the GUI 110 of the videoconferencing application 110 being operated at the endpoint device 220A. The endpoint device 220A may be operating the videoconferencing application 100 in a VM environment, and the host device 210 may remotely control the endpoint device 220A to receive and process the source data and to generate the video images 122 outside the VM environment. For example, the host device 210 may control the endpoint device 220A to overlay the video images 122 on the GUI 110 of the videoconferencing application 100 to avoid a delay or slowing down in displaying the video image at the endpoint device 220A.

At step 520, the device may determine, based on the user interaction data, that the user interaction causes a display conflict between the GUI of the remote device and visual information displayed on the GUI of the remote device. The display conflict may occur when the visual information displayed on the GUI of the remote device at least partially overlapping the visual element caused to be displayed on the remote device by the remote device user's interaction with the GUI of the remote device. For example, referring to FIGS. 2 and 4, when the received remote user interaction data indicates that the remote user has selected the avatar 132C, the host device 210 may determine that the visual element 400 activated to appear on the visual information display area 120 of the GUI 110 may be overlapped by the video image 122 overlaid on the visual information display area 120.

At 530, the device may resolve the display conflict by causing the remote device to display modified visual information. For example, the host device 210 may send the coordinates information of the visual element 400 to the endpoint device 220A. The endpoint device 220 may then remove a portion of the overlapping video image 122 corresponding to the coordinates of the activated visual element 400, as shown in FIG. 4, allowing the visual element 400 to be seen and interacted by the remote user without terminating the on-going videoconferencing session or stopping the video image 122 from being overlaid on the GUI 110. Accordingly, the display conflict between the GUI 110 of the videoconferencing application 100 and the displayed video image 122 may be reduced or eliminated.

Figure 6:
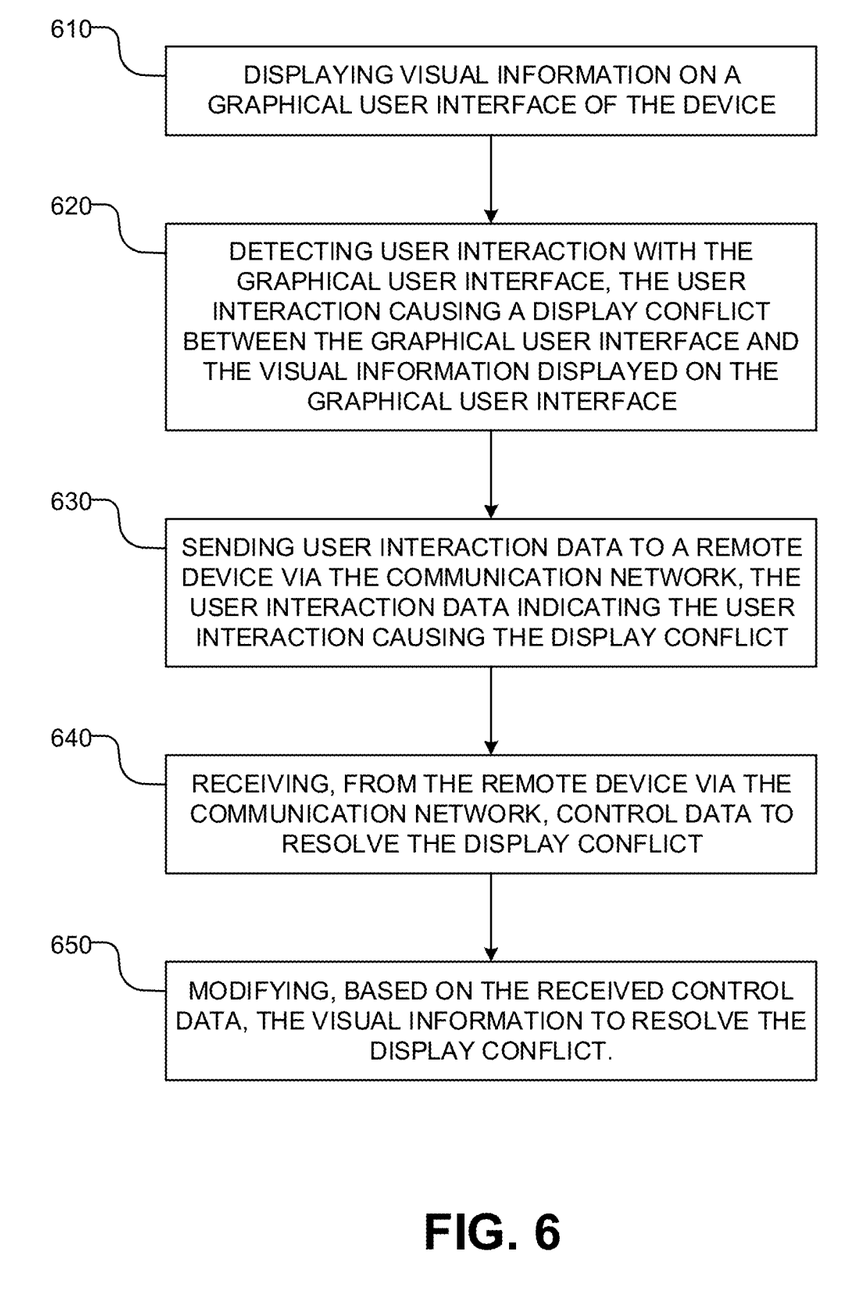
FIG. 6 is a flowchart of an implementation of a process for operating an endpoint device to eliminate or reduce a display conflict.

FIG. 6 is a flowchart of an implementation of a process for operating a device, such as the endpoint device 220, to eliminate or reduce a display conflict. At step 610, the device may display visual information on a graphical user interface of the device. For example, the endpoint device 220A may receive source data from the host device 210 via the communication network 230. Alternatively, the endpoint device 220A may receive source data from other endpoint devices 220B and 220C without going through the host device 210. The host device 210 may be in communication with the endpoint devices 220B and 220C to cause the source data from the endpoint devices 220B and 220C to be directed to the endpoint device 220A. The endpoint device 220A may then generate the video images 122 based on the received source data and display the generated video images 122 on the GUI 110 of the videoconferencing application 100. When the videoconferencing application 100 is operating in a VM environment, the endpoint device 220A may overlay or combine the videos on the GUI 110 to avoid a delay or slowing down in displaying the video images 122.

At step 620, the device may detect user interaction with the graphical user interface. The user interaction may cause a display conflict between the GUI and the visual information displayed on the GUI. For example, referring to FIG. 4, the user may click the avatar 132C to activate the pop-up menu 400 to appear on the visual information display area 120 of the GUI 110. The activated pop-up menu 400 may be at least partially overlapped and hidden by the video image 122 overlaid onto the visual information display area 120 of the GUI 110. Hence, the user may not be able to see or interact with the pop-up menu 400.

At step 630, the device may send user interaction data to a remote device via the communication network. The user interaction data may indicate that the user interaction causes the display conflict. For example, the user interaction data may indicate that the user may click the avatar 132C to activate the pop-up menu 400 to appear on the visual information display area 120 of the GUI 110. The host device 210 may store coordinates information of the pop-up menu 400 in a data storage and retrieve the stored coordinate information to determine whether the pop-up menu 400 is overlapped by the video image 122 overlaid onto the visual information display area 120 of the GUI 110, thereby causing a display conflict between the GUI 110 and video image 122.

At step 640, the device may receive, from the remote device via the communication network, control data to resolve the display conflict. For example, the endpoint device 220A may receive, from the host device 210 via the communication network 230, control data, which may include coordinates information of the visual element 400. The coordinates information may include coordinates of the entire visual element 400 or a portion of the visual element 400 overlapped by the displayed video image 122. Alternatively, the coordinates information of the visual element 400 may be locally available to the endpoint device 220A and the control data may include a command to remove a portion of the video image 122 overlapping the visual element 400.

At step 650, the device may modify, based on the received control data, the visual information to resolve the display conflict. For example, based on the received coordinates information received from the host device 210, the endpoint device 220 may modify the video image 122 to remove a portion of the video image 122 corresponding to the coordinates of the visual element 400 appearing on the visual information display area 120 of the GUI 110. This may eliminate or reduce the display conflict between the GUI 110 of the videoconferencing application 100 and the displayed video image 122, which may allow the visual element 400 to be seen and interacted with the user without terminating the on-going videoconferencing session or stopping the video image 122 from being displayed on the GUI 110.

As shown in FIGS. 1A and 1B, the GUI 110 of the videoconferencing application 100 may divided into a plurality of display areas, and each display area may be designated to display visual information generated based on source data originated from a remote videoconferencing participant. For example, as shown in FIGS. 1A and 1B, when there are four remote participants, the visual information display area 120 of the GUI 110 may be divided into four different display areas showing videos 122A, 122B, 122C and 122D, respectively. When a visual element 132, such as, the pop-up menu 400 shown in FIG. 4, is caused to appear by the user interaction with the GUI 110, such as clicking the avatar 132C using a mouse, the endpoint device 220 may send user interaction data to the host device 210. The user interaction data may indicate that the user interaction causes the pop-up menu 400 to appear, which may be overlapped and hidden by one or more of the videos 122A, 122B, 122C and 122D displayed on the four different display areas of the visual information display area 120.

To determine whether a display conflict has occurred at the endpoint device 220, the host device 210 may determine, based on the user interaction data, whether the pop-up menu 400 is at least overlapped and hidden by any of the videos 122A, 122B, 122C and 122D. Then, the host device 210 may determine which one or ones of the videos 122A, 122B, 122C and 122D need to be modified to resolve the display conflict. Such determination may be done based on the coordinates information of the pop-up menu 400 as shown in FIG. 4, and coordinates information of the videos 122A, 122B, 122C and 122D. When the pop-up menu 400 is at least partially overlapped by the video 122B as shown in FIG. 1B, the endpoint device 220 may modify the video 122B to remove a portion of the video 122B corresponding to the coordinates of the pop-up menu 400, as shown in FIG. 1B. When the pop-up menu 400 is at least partially overlapped by two or more videos 122, each video 122 may be modified to remote a portion overlapping the pop-up menu 400. The modified videos 122 may be stopped or paused or replaced with a name or avatar until the pop-up menu 400 is deactivated to disappear from the GUI 110.

Figure 7:
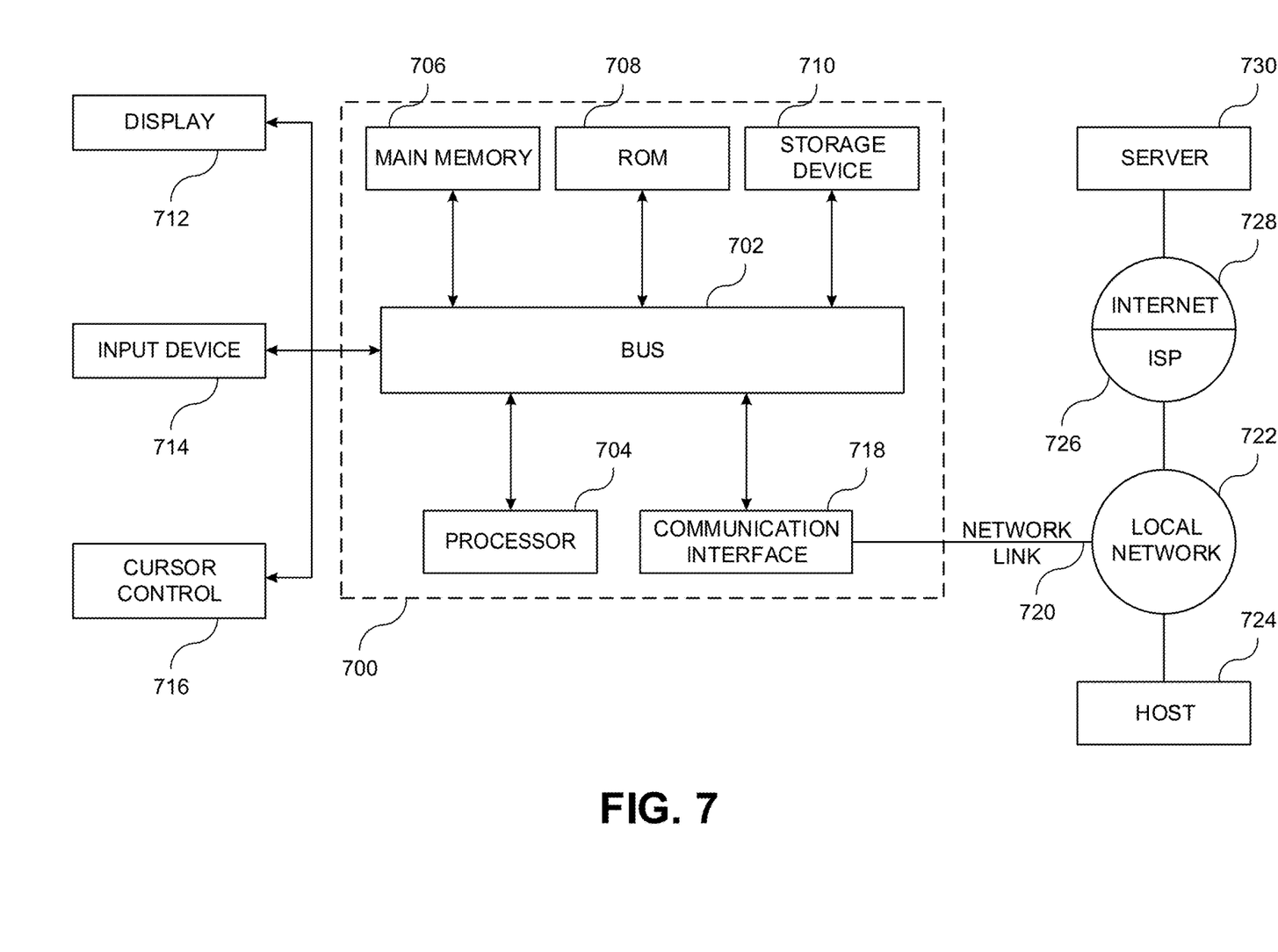
FIG. 7 is a block diagram showing an example computer system upon which various implementations of this disclosure may be implemented.

FIG. 7 is a block diagram showing an example a computer system 700 upon which various implementations of this disclosure may be implemented. The computer system 700 may include a bus 702 or other communication mechanism for communicating information, and a processor 704 coupled with the bus 702 for processing information. The computer system 700 may also include a main memory 706, such as a random-access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704. The computer system 700 may be implemented as, for example, the host device 210 and endpoint devices 220.

The computer system 700 may further include a read only memory (ROM) 708 or other static storage device coupled to the bus 702 for storing static information and instructions for the processor 704. A storage device 710, such as a flash or other non-volatile memory may be coupled to the bus 702 for storing information and instructions.

The computer system 700 may be coupled via the bus 702 to a display 712, such as a liquid crystal display (LCD), for displaying information. One or more user input devices, such as the example user input device 714 may be coupled to the bus 702, and may be configured for receiving various user inputs, such as user command selections and communicating these to the processor 704, or to the main memory 706. The user input device 714 may include physical structure, or virtual implementation, or both, providing user input modes or options, for controlling, for example, a cursor, visible to a user through display 712 or through other techniques, and such modes or operations may include, for example virtual mouse, trackball, or cursor direction keys.

The computer system 700 may include respective resources of the processor 704 executing, in an overlapping or interleaved manner, respective program instructions. Instructions may be read into the main memory 706 from another machine-readable medium, such as the storage device 710. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 710. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 700 may also include a communication interface 718 coupled to the bus 702, for two-way data communication coupling to a network link 720 connected to a local network 722. The network link 720 may provide data communication through one or more networks to other data devices. For example, the network link 720 may provide a connection through the local network 722 to a host computer 724 or to data equipment operated by an Internet Service Provider (ISP) 726 to access through the Internet 728 a server 730, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device for resolving a display conflict at a remote device, comprising:
a processor; and
a memory in communication with the processor, the memory comprising executable instructions that, when executed by the processor, cause the processor to control the device to perform functions of:
controlling the remote device to generate a graphical user interface (GUI) at the remote device, the remote device configured to (i) generate a video based on source data provided from a source other than the device and (ii) display the generated GUI and video simultaneously via a display;
receiving, from the remote device via a communication network, user interaction data indicating user interaction with the GUI of the remote device;
determining, based on the received user interaction data, that the user interaction with the GUI causes a display conflict between the GUI and video, the display conflict including the video at least partially overlapping the GUI; and
causing the remote device to remove a portion of the video that overlaps the GUI.

2. The device of claim 1, wherein the instructions, when executed by the processor, further cause the processor to control the device to perform a function of causing the source data to be directed from the source to the remote device via the communication network.

3. The device of claim 1, wherein, for determining that the user interaction causes the display conflict, the instructions, when executed by the processor, further cause the processor to control the device to perform functions of:
determining that the user interaction causes a visual element to appear, the visual element being part of the GUI; and
determining that the video at least partially overlaps the visual element.

4. The device of claim 3, wherein the visual element comprises a pop-up menu, dialog box or notification of the GUI.

5. The device of claim 1, wherein the instructions, when executed by the processor, further cause the processor to control the device to perform a function of stopping or pausing the video when it is determined that the user interaction causes the display conflict.

6. The device of claim 1, wherein the remote device operates a virtual application comprising the GUI in a virtual machine environment, generates the video outside the virtual machine environment, and overlays the generated video on the GUI of the virtual application.

7. The device of claim 6, wherein:
the GUI of the virtual application comprises a video display area and a menu area,
the video is overlaid on the video display area of the GUI, and
for determining that the user interaction causes the display conflict, the instructions, when executed by the processor, further cause the processor to control the device to perform functions of:
determining that the user interaction causes a visual element to appear on the video display area of the GUI; and
determining that the video at least partially overlaps the visual element.

8. The device of claim 1, wherein:
the video comprises a plurality of video streams,
the GUI comprises a video display area divided into a plurality of areas to display the plurality of video streams, respectively, for determining that the user interaction causes the display conflict, the instructions, when executed by the processor, further cause the processor to control the device to perform a function of determining whether one or more of the video streams at least partially overlap the visual element, and for causing the remote device to remove a portion of the video, the instructions, when executed by the processor, further cause the processor to control the device to perform a function of causing the remote device to remove a portion of each video stream overlapping the visual element.

9. A method of operating a device for resolving a display conflict at a remote device, comprising:

controlling the remote device to generate a graphical user interface (GUI) at the remote device, the remote device configured to (i) generate a video based on source data provided from a source other than the device and (ii) display the generated GUI and video simultaneously via a display;

receiving, from the remote device via a communication network, user interaction data indicating user interaction with the GUI of the remote device;

determining, based on the received user interaction data, that the user interaction with the GUI causes a display conflict between the GUI and video via the display, the display conflict including the video at least partially overlapping the GUI; and causing the remote device to remove a portion of the video that overlaps the GUI.

10. The method of claim 9, further comprising causing the source data to be directed from the source to the remote device via the communication network.

11. The method of claim 9, wherein determining that the user interaction causes the display conflict comprises:

determining that the user interaction causes a visual element to appear, the visual element being part of the GUI; and determining that the video at least partially overlaps the visual element.

12. The method of claim 9, wherein the visual element comprises a pop-up menu, dialog box or notification of the GUI.

13. The method of claim 9, further comprising stopping or pausing the video when it is determined that the user interaction causes the display conflict.

14. The method of claim 9, wherein the remote device operates a virtual application comprising the GUI in a virtual machine environment, generates the video outside the virtual machine environment; and overlays the generated video on the GUI of the virtual application.

15. The method of claim 14, wherein:

the GUI of the virtual application comprises a video display area and a menu area, the video is overlaid on the video display area of the GUI, and determining that the user interaction causes the display conflict comprises:

determining that the user interaction causes a visual element to appear on the video display area of the GUI; and determining that the video at least partially overlaps the visual element.

16. The method of claim 15, wherein:

the video comprises a plurality of video images streams displayed on the GUI, and the GUI comprises a video display area divided into a plurality of areas to display the plurality of video streams, respectively, determining that the user interaction causes the display conflict comprises determining that one or more of the video streams at least partially overlap the visual element; and causing the remote device to remove a portion of the video comprises causing the remote device to remove a portion of each video image overlapping the visual element.

17. A non-transitory computer readable medium containing instructions which, when executed by a processor, cause a device to perform functions of:

controlling a remote device to generate a graphical user interface (GUI) at the remote device, the remote device configured to (i) generate a video based on source data provided from a source other than the device and (ii) display the generated GUI and video simultaneously via a display;

receiving, from a the remote device via a communication network, user interaction data indicating user interaction with a graphical user interface (GUI) of the remote device;

determining, based on the received user interaction data, that the user interaction with the GUI causes a display conflict between the GUI and video displayed via the display, the display conflict including the video at least partially overlapping the GUI; and causing the remote device to remove a portion of the video that overlaps the GUI.

18. The non-transitory computer readable medium of claim 17, wherein, for determining that the user interaction causes the display conflict, the instructions, when executed by the processor, further cause the processor to control the device to perform functions of:

determining that the user interaction causes a visual element to appear, the visual element being part of the GUI; and determining that the video at least partially overlaps the visual element.

19. The non-transitory computer readable medium of claim 18, wherein the visual element comprises a pop-up menu, dialog box or notification of the GUI.

20. The non-transitory computer readable medium of claim 17, wherein the remote device operates a virtual application comprising the GUI in a virtual machine environment, generates the video outside the virtual machine environment, and overlays the generated video on the GUI of the virtual application.

* * * * *